United States Patent [19]

Brackett

[11] Patent Number: 5,351,567
[45] Date of Patent: Oct. 4, 1994

[54] MOTION ARRESTER FOR A CONJUGATE DRIVE MECHANISM

[76] Inventor: Douglas C. Brackett, P.O. Box 306, Portland, Me. 04112

[21] Appl. No.: 148,492

[22] Filed: Nov. 8, 1993

[51] Int. Cl.⁵ ............................................. F16H 21/18
[52] U.S. Cl. ............................................ 74/49; 74/50
[58] Field of Search ................. 74/49, 50; 123/56 AC, 123/56 BC, 197.3, 197.4

[56] References Cited

U.S. PATENT DOCUMENTS

| | | |
|---|---|---|
| 130,371 | 8/1872 | Hendryx . |
| 139,499 | 6/1873 | Doolittle . |
| 283,558 | 8/1883 | Baumgarten . |
| 637,450 | 11/1899 | Doolittle . |
| 813,736 | 2/1906 | Pendleton . |
| 999,220 | 8/1911 | Harmon . |
| 1,151,220 | 8/1915 | Scherling . |
| 1,156,055 | 10/1918 | Bullock . |
| 2,312,057 | 2/1943 | Williams . |
| 2,583,050 | 1/1952 | Harrower . |
| 2,628,602 | 2/1953 | Butterfield . |
| 2,797,589 | 7/1957 | Claveneaud . |
| 3,332,303 | 7/1967 | Daugherty . |
| 3,901,100 | 8/1975 | Iida et al. . |
| 4,173,845 | 11/1979 | Heesch . |
| 4,270,395 | 6/1981 | Grundy . |
| 4,590,812 | 5/1986 | Brackett . |
| 4,685,342 | 8/1987 | Brackett . |
| 4,722,239 | 2/1988 | Fleck et al. . |
| 4,779,472 | 10/1988 | Brackett . |
| 4,915,019 | 4/1990 | Hovaguimian . |
| 5,109,728 | 5/1992 | Muszak . |
| 5,259,256 | 11/1993 | Brackett . |

Primary Examiner—Allan D. Herrmann
Assistant Examiner—David W. Laub
Attorney, Agent, or Firm—Ralph W. Selitto, Jr.

[57] ABSTRACT

A conjugate drive mechanism of a scotch yoke type motion converter includes a conjugate driver, which is rotatably mounted on a crankpin, and a bearing conjugate, which is mounted on a linearly movable shuttle. The conjugate driver moves relative to the bearing conjugate between a pair of end points. A motion arrester functions to arrest the motion of the conjugate driver as it reaches each of its end points of travel relative to the bearing conjugate.

25 Claims, 8 Drawing Sheets

MOTION ARRESTER FOR A CONJUGATE DRIVE MECHANISM

FIELD OF THE INVENTION

The present invention relates to motion arresters for maximizing the efficiency of a scotch yoke type motion converter, and, more particularly, a motion arrester for improving the effectiveness of a conjugate drive mechanism in a scotch yoke type motion converter. As used herein, the term "conjugate drive mechanism" shall connote a combination of at least two mechanical components (i.e., a "conjugate driver" and a "bearing conjugate") adapted to mesh or engage in conjugation with each other, such as through the provision of meshable tracking profiles (i.e., undulations), during the operation of an associated motion converter which functions to convert rotary motion to rectilinear motion and vice versa.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder (see, e.g., U.S. Pat. Nos. 283,558; 813,736; 999,220; and 2,628,602), as well as in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear motion and vice versa (i.e., there is no translation during traversal of the clearance gap), and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

U.S. Pat. No. 4,685,342 to Douglas C. Brackett, the inventor herein, discloses a unique scotch yoke device having a pair of opposing, offset bearing conjugates, one on either side of the crankpin slot in the shuttle. A corresponding pair of conjugate drivers is arranged on the crankpin, the conjugate drivers being coaxially and laterally displaced from one another such that each aligns with a corresponding one of the bearing conjugates. As the conjugate drivers move back and forth along their corresponding bearing conjugates within a pre-defined range, tracking profiles on the conjugate drivers and mating profiles on the bearing conjugates mesh in conjugation throughout the motion of the device; and, thus, the conjugate drivers cooperate with the bearing conjugates to form a "conjugate drive mechanism"as that term is defined herein. While the device disclosed in the Brackett '342 Patent minimizes clearance at the crankpin/slot interface to that attributable to manufacturing tolerances and also reduces friction between the crankpin and the shuttle slot to the rolling friction of a roller bearing, these advantages are realized without providing the conjugate drive mechanism with means adapted to minimize any backlash which may be present at each end of the range of motion of the conjugate drivers relative to their associated bearing conjugates.

SUMMARY OF THE INVENTION

The present invention relates to a motion arrester for a conjugate drive mechanism of a scotch yoke type motion converter which includes a rotatable crankshaft having a crankpin, a conjugate driver rotatably mounted on the crankpin, and a bearing conjugate mounted on a linearly movable shuttle such that the bearing conjugate is in continuous meshing engagement with the conjugate driver between a pair of end points. The motion arrester, which may, for example, include a pair of stop pads provided on the conjugate driver and/or the bearing conjugate, functions to arrest the motion of the conjugate driver relative to the bearing conjugate when the conjugate driver reaches each of its end points of motion. The motion arrester thereby minimizes any backlash which may be present at each end of the range of motion of the conjugate driver relative to the bearing conjugate, whereby the present invention enhances the energy efficiency and wear resistance properties of the conjugate drive mechanism.

BRIEF DESCRIPTION OF THE DRAWINGS

For a better understanding of the present invention, reference is made to the following description of various exemplary embodiments of the invention considered in conjunction with the accompanying drawings, in which.

DESCRIPTION OF THE EXEMPLARY EMBODIMENTS

Although the present invention can be used with any conjugate drive mechanism, it is particularly suitable for use in connection with conjugate drive mechanisms adapted for use in the scotch yoke type of motion converters disclosed in Brackett U.S. Pat. No. 4,685,342 and in applicant's copending U.S. patent application Ser. No. 07/924,547, filed Jul. 31, 1992, now U.S. Pat. No. 5,259,256. Accordingly, the present invention will be described hereinafter in connection with conjugate drive mechanisms adapted for use in combination with such motion converters. It should be understood, however, that the following description is only meant to be illustrative of the present invention and is not meant to limit the scope of the present invention, which has applicability to other types of motion converters.

Figure 1:
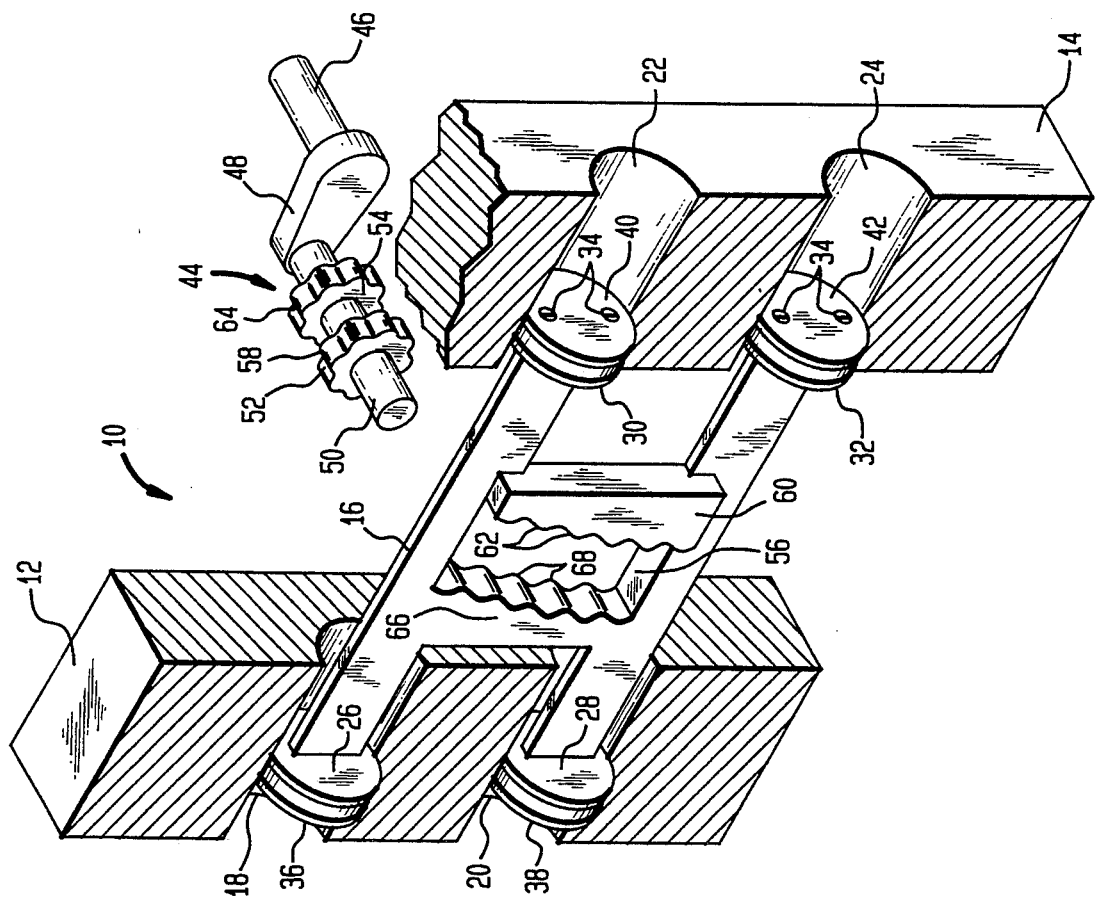
FIG. 1 is an exploded perspective view of a piston engine incorporating a motion converter which is equipped with a first exemplary embodiment of a motion arrester constructed in accordance with the present invention.
Figure 2:
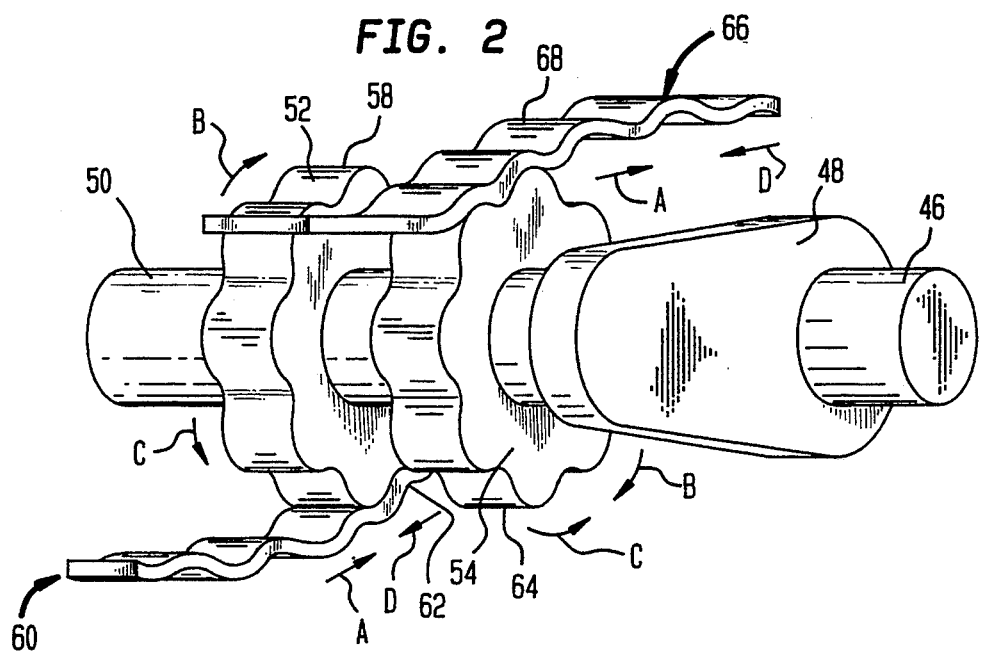
FIG. 2 is an enlarged perspective view of a portion of the motion converter shown in FIG. 1.

FIGS. 1 and 2 show a piston engine 10 constructed in accordance with the teachings of Brackett U.S. Pat. No. 4,685,342, the specification of which is incorporated herein by reference. The piston engine 10 includes a pair of cylinder blocks 12, 14 and a piston shuttle 16. The cylinder block 12 is provided with a pair of cylinders 18, 20, while the cylinder block 14 is provided with a pair of cylinders 22, 24. The shuttle 16 includes a first pair of pistons 26, 28 mounted for reciprocating linear motion in the cylinders 18, 20, respectively, and a second pair of pistons 30, 32 mounted for reciprocating linear motion in the cylinders 22, 24, respectively. The pistons 26, 28, 30, 32 are fastened to the shuttle 16, by screws 34, which are threadedly received in holes (not shown) provided in faces 36, 38, 40, 42 of the pistons 26, 28, 30, 32, respectively, and extending into the shuttle 16.

A crank 44 is operatively associated with the shuttle 16. More particularly, the crank 44 includes a crankshaft 46, a crankarm 48 mounted for conjoint rotation with the crankshaft 46, and a crankpin 50 mounted for conjoint rotation with the crankshaft 46, the crankpin 50 and the crankshaft 46 being offset relative to each other. Conjugate drivers 52, 54 are rotatably mounted on the crankpin 50, which extends through a slot 56 provided in the shuttle 16 such that the conjugate driver 52, which includes a circumferential tracking profile (i.e., undulations) 58, is in constant engagement with a bearing conjugate 60, which includes a circumferential mating profile (i.e., undulations) 62, located on one side of the shuttle 16 and such that the conjugate driver 54, which includes a circumferential tracking profile (i.e., undulations) 64, is in constant engagement with a bearing conjugate 66, which includes a circumferential mating profile (i.e., undulations) 68, located on an opposite side of the shuttle 16. The conjugate drivers 52, 54 and the bearing conjugates 60, 66, respectively, mesh together in conjugation throughout the range of motion of the piston engine 10; and, thus, they cooperate to form a conjugate drive mechanism as that term is defined herein.

In operation, as the pistons 26, 28, 30, 32 reciprocate linearly in the cylinders 18, 20, 22, 24, respectively, the conjugate drivers 52, 54 move back and forth along the bearing conjugates 60, 66, respectively. More particularly, as the conjugate drivers 52, 54 move in conjugation (i.e., mesh) along the bearing conjugates 60, 66, respectively, in a first direction (indicated by arrows A in FIG. 2), the conjugate driver 52 rotates in one arcuate direction (indicated by arrows B in FIG. 2) and the conjugate driver 54 rotates in an opposite arcuate direction (indicated by arrows C in FIG. 2). As the conjugate drivers 52, 54 move along the bearing conjugates 60, 66, respectively, in a second direction (indicated by arrows D in FIG. 2), the conjugate driver 52 rotates in the arcuate direction indicated by the arrows C and the conjugate driver 54 rotates in the arcuate direction indicated by the arrows B. Because the conjugate drivers 52, 54 are in constant engagement with the bearing conjugates 60, 66, respectively, as the conjugate drivers 52, 54 move back and forth along the bearing conjugates 60, 66, respectively, the linear motion of the shuttle 16 is continuously converted into the rotary motion of the crank 44 to thereby reduce backlash.

Figure 3A:
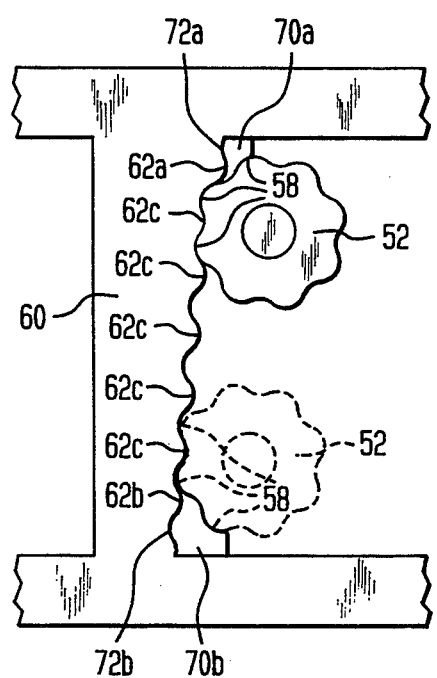
FIGS. 3a and 3b are a series of schematic front elevational views of the first exemplary embodiment as the motion converter of FIGS. 1 and 2 is moved through a portion of its range of motion.

Referring to FIG. 3a, the conjugate driver 52 has a pre-defined range of movement relative to the bearing conjugate 60, the range being delimited by two end points: one of which is represented by the solid line representation of the conjugate driver 52 and the other of which is represented by the broken line representation of the conjugate driver 52. More particularly, the bearing conjugate 60 has exterior undulations 62a, 62b and interior undulations 62c, which mesh with the undulations 58 of the conjugate driver 52 and therefore function much like gear teeth. Stop pads 70a, 70b are provided on surfaces 72a, 72b, respectively, of the exterior undulations 62a, 62b, respectively. The stop pads 70a, 70b modify the profiles of the exterior undulations 62a, 62b so as to create increased surface engagement with their corresponding undulations 58 of the conjugate driver 52, thereby arresting the motion of the conjugate driver 52 and inhibiting it from moving beyond either of its end points and, as a result, reducing backlash and scuffing when the conjugate driver 52 reaches such end points. In other words, the stop pads 70a, 70b provide improved contact between the bearing conjugate 60 and the conjugate driver 52, thereby increasing the effectiveness of the conjugate drive mechanism.

The stop pads 70a, 70b can be made from a material which is the same as or different from that of the bearing conjugate 60 and/or the conjugate driver 52 and can be separate elements which are permanently and fixedly attached to the bearing conjugate 60. Alternatively, the stop pads 70a, 70b can be separate elements which are permanently and fixedly attached to the conjugate driver 52 or to the bearing conjugate 60 and conjugate driver 52, provided that the conjugate driver 52 makes less than a complete revolution when it moves back and forth along the bearing conjugate 60. The stop pads 70a, 70b can also be made integrally with the bearing conjugate 60 and/or with the conjugate driver 52. Further, the stop pads 70a, 70b can be removably attached to the bearing conjugate 60 and/or to the conjugate driver 52 so that the stop pads 70a, 70b can be removed for repair, replacement, etc. In addition, the stop pads 70a, 70b can be made adjustable by any conventional means to compensate for any wear of the stop pads 70a, 70b and/or the conjugate driver 52.

Figure 3B:
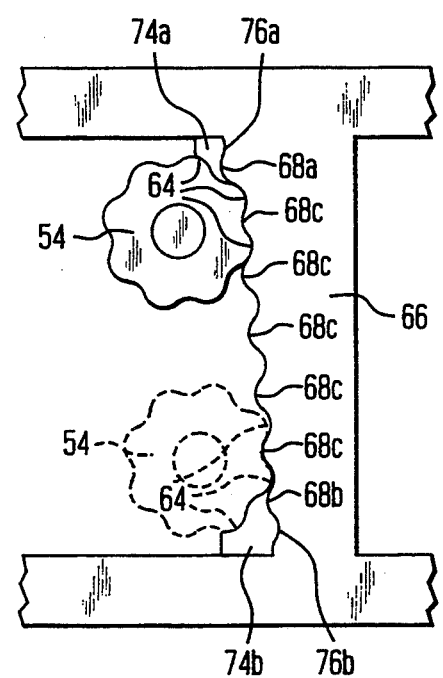

Referring to FIG. 3b, the conjugate driver 54 has a pre-defined range of movement relative to the bearing conjugate 66, the range being delimited by two end points: one of which is represented by the solid line representation of the conjugate driver 54 and the other of which is represented by the broken line representation of the conjugate driver 54. More particularly, the bearing conjugate 66 has exterior undulations 68a, 68b and interior undulations 68c, which mesh with the undulations 64 of the conjugate driver 54 and therefore function much like gear teeth. Stop pads 74a, 74b are provided on surfaces 76a, 76b, respectively, of the exterior undulations 68a, 68b, respectively. The stop pads 74a, 74b modify the profiles of the undulations 68a, 68b so as to create increased surface engagement with their corresponding undulations 64 of the conjugate driver 54, thereby arresting the motion of the conjugate driver 54 and inhibiting it from moving beyond either of its end points and, as a result, reducing backlash and scuffing when the conjugate driver 54 reaches such end points. In other words, the stop pads 74a, 74b provide improved contact between the bearing conjugate 66 and the conjugate driver 54, thereby increasing the effectiveness of the conjugate drive mechanism.

The stop pads 74a, 74b can be made from a material which is the same as or different from that of the bearing conjugate 66 and/or the conjugate driver 54 and can be separate elements which are permanently and fixedly attached to the bearing conjugate 66. Alternatively, the stop pads 74a, 74b can be separate elements which are permanently and fixedly attached to the conjugate driver 54 or to the bearing conjugate 66 and conjugate driver 54, provided that the conjugate driver 54 makes less than a complete revolution when it moves back and forth along the bearing conjugate 66. The stop pads 74a, 74b can also be made integrally with the bearing conjugate 66 and/or with the conjugate driver 54. Further, the stop pads 74a, 74b can be removably attached to the bearing conjugate 66 and/or to the conjugate driver 54 so that the stop pads 74a, 74b can be removed for repair, replacement, etc. In addition, the stop pads 74a, 74b can be made adjustable by any conventional means to compensate for any wear of the stop pads 74a, 74b and/or the conjugate driver 54.

As can be seen from a comparison of FIGS. 3a and 3b, the conjugate driver 52 engages the stop pad 70a at the same time that the conjugate driver 54 engages the stop pad 74a. Similarly, the conjugate driver 52 engages the stop pad 70b at the same time that the conjugate driver 54 engages the stop pad 74b. The motion of conjugate driver 52 and the motion of the conjugate driver 54 are, therefore, arrested simultaneously at each of the end points.

Figure 4:
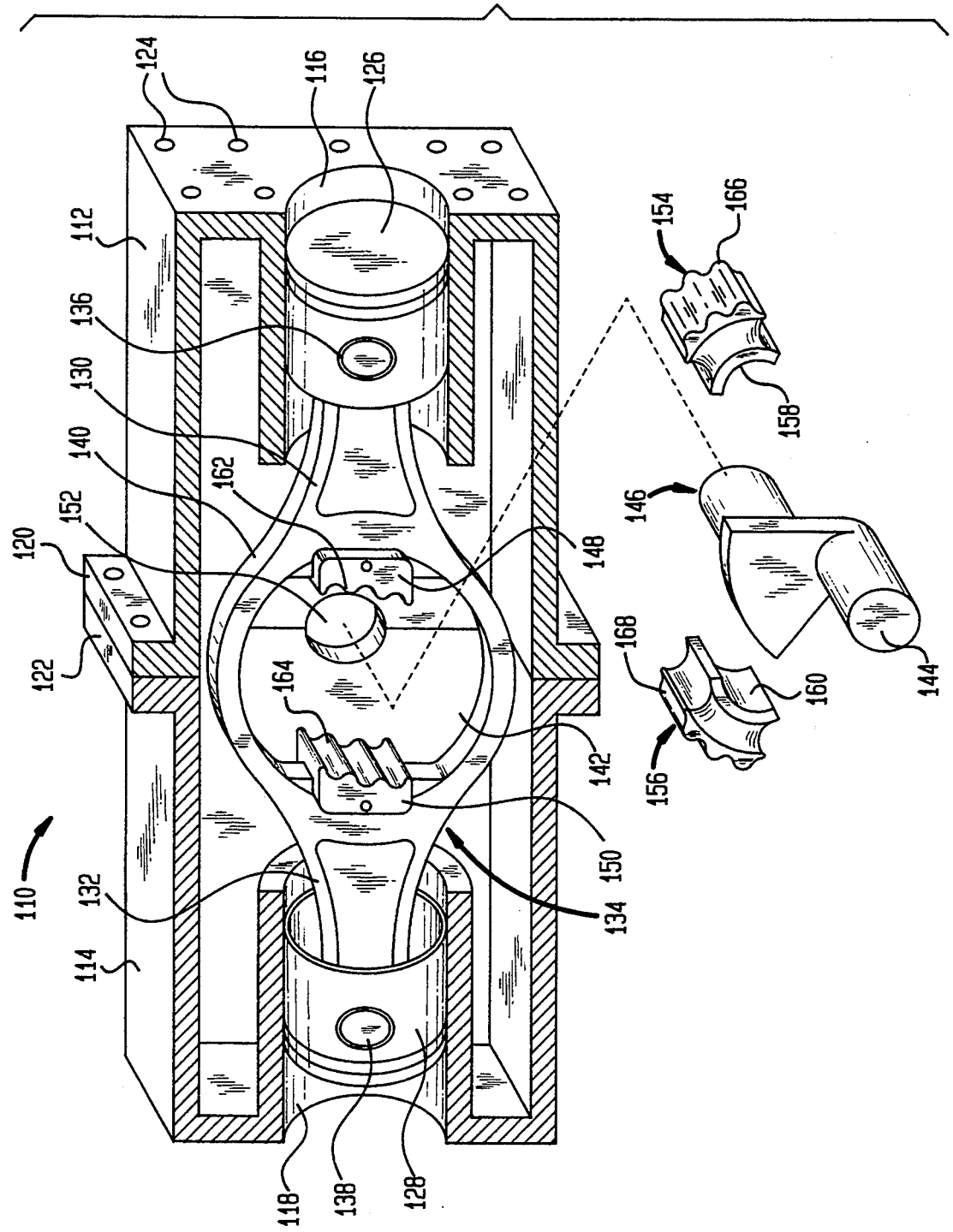
FIG. 4 is an exploded perspective view of a reciprocating piston device incorporating a motion converter which is equipped with a second exemplary embodiment of a motion arrester constructed in accordance with the present invention.
Figure 5:
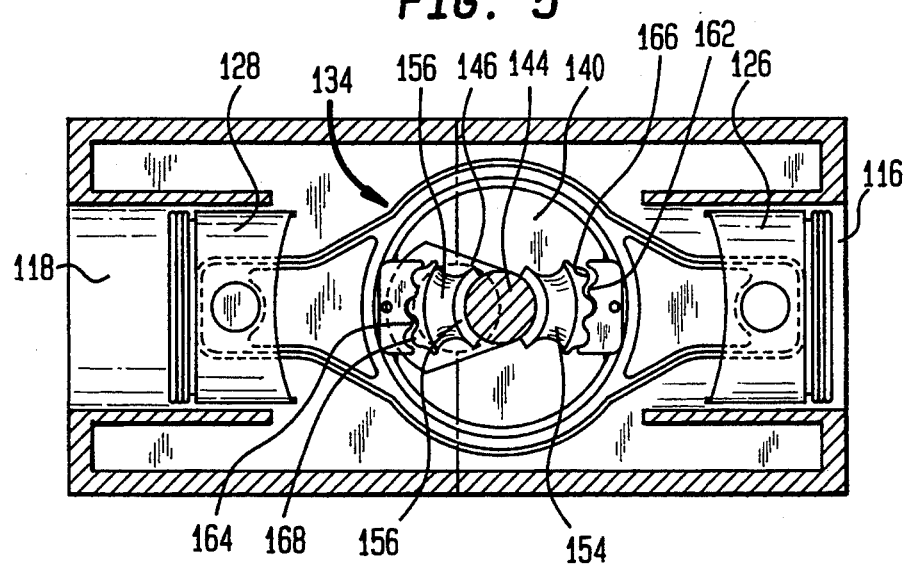
FIGS. 5-8 are a series of schematic from elevational views of the second exemplary embodiment as the motion converter of FIG. 4 is moved through a portion of its range of motion.
Figure 6:
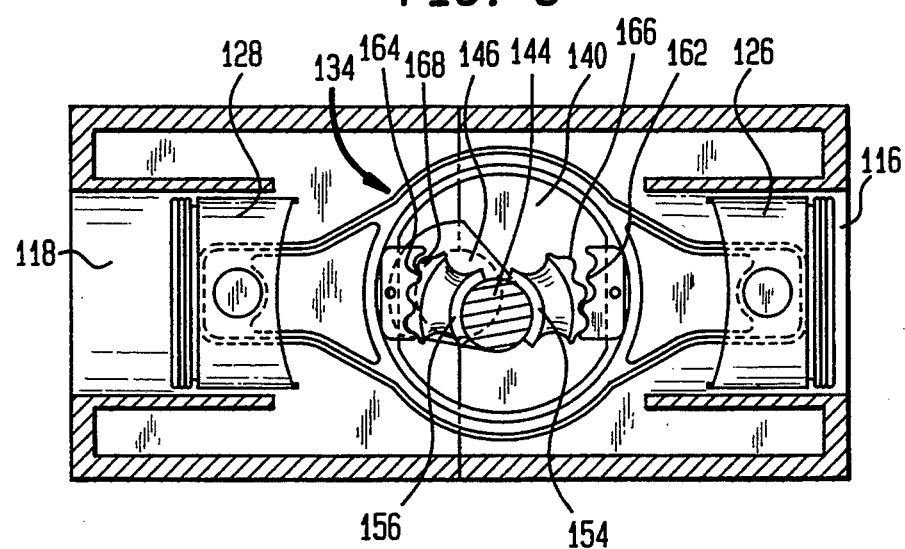
Figure 7:
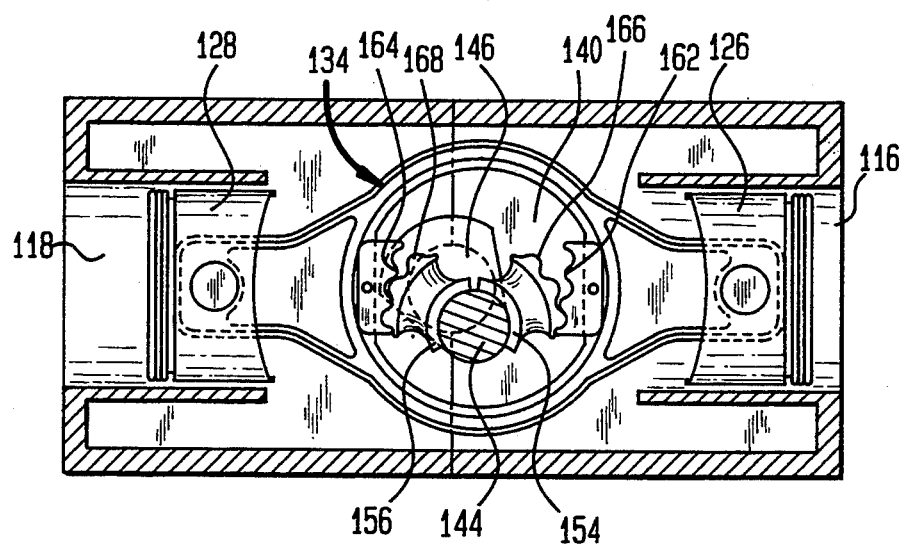
Figure 8:
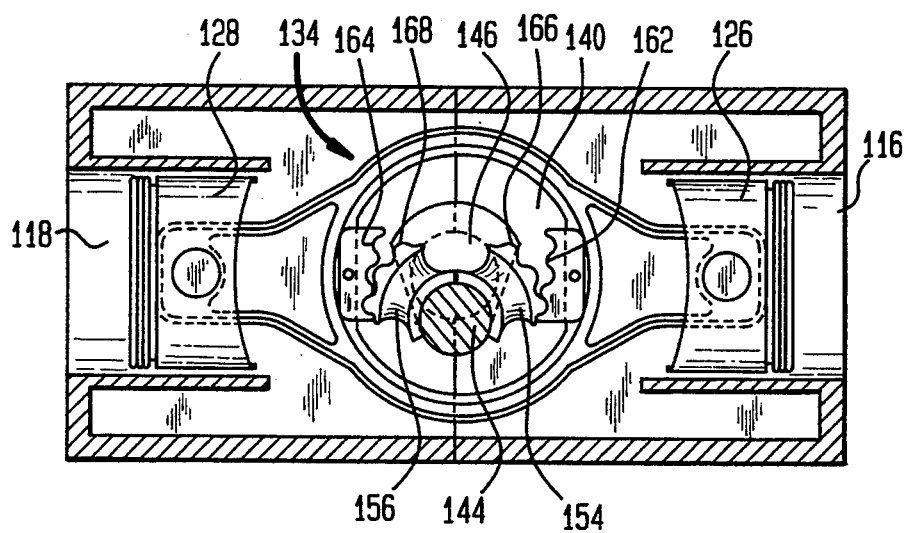

FIG. 4 shows a piston device 110 constructed in accordance with the teachings of applicant's copending U.S. patent application Ser. No. 07/924,547 filed Jul. 31, 1992, now U.S. Pat. No. 5,259,256, the specification of which is incorporated herein by reference. The piston device 110 comprises a pair of cylinder blocks 112, 114, each of which has a cylinder bore 116 and 118, respectively. The cylinder blocks 112, 114 would be joined together via opposing flanges 120, 122 by bolts etc. or by studs extending through the blocks and projecting from holes 124 for securing a cylinder head (not shown) via suitable nuts (not shown) as would be conventional in constructing cylinder blocks with opposed cylinders. The cylinder bores 116 and 118 :receive corresponding pistons 126 and 128 which are mounted upon the terminal ends of extensions 130 and 132 of shuttle 134 by wrist pins 136 and 138 or other conventional means. The extensions 130 and 132 emanate from a common yoke portion 140 of the shuttle 134.

The yoke portion 140 is provided with an aperture 142 which accommodates a crankpin 144 of crankshaft 146. The internal peripheral boundary of the aperture 142, instead of simply being a smooth slot, includes a pair of bearing conjugates 148 and 150 on either side thereof. In the embodiment depicted, the bearing conjugates 148, 150 are a pair of discrete elements, each being bolted to the shuttle 134 on opposing sides of the aperture 142. Alternatively, the bearing conjugates 148, 150 could be defined by an apertured plate or plates secured to or integrated with the shuttle 134, the aperture being formed such that the interior periphery defines the bearing conjugates 148, 150. It should be appreciated that while the aperture 142 passes completely through the shuttle 134, it is possible to replace the aperture 142 with a recess or blind hole. For example, in the device shown in FIG. 4, if the yoke portion 140 were closed by a continuous metal surface on the side closest to the viewer, a recess facing toward bearing opening 152 would be formed. This recess could accommodate the free end of the crankpin 144. The use of the aperture 142 is beneficial because it permits the crankshaft 146 to project through the shuttle 134, whereby additional bearings and crankpins may be made a part thereof, such as, for example, to cooperate with another set of adjacent pistons.

The crankpin 144 has a pair of conjugate drivers 154, 156 rotatably associated therewith when the crankshaft 146 is in place in the bearing opening 152, as is more clearly shown in FIGS. 5–8. With the crankshaft 146 positioned within the opening 152 and the crankpin 144, including the conjugate drivers 154 and 156, positioned within the aperture 142 of the yoke portion 140, the conjugate drivers 154, 156 mesh with the bearing conjugates 148, 150, respectively, which capture the crankpin 144 and the conjugate drivers 154, 156 therebetween. The crankpin 144 is isolated from contact with the periphery of the yoke portion 140 and instead bears upon bearing surfaces 158, 160 of the conjugate drivers 154, 156, respectively. As can be appreciated, this arrangement prevents the crankpin 144 from bearing upon the yoke portion 140 directly and permits the fitting of the crankpin 144 to the aperture 142 within manufacturing tolerances. As can be seen in FIGS. 5–8, the bearing conjugates 148, 150, which include mating profiles (i.e., undulations) 162, 164, respectively, formed on tracking surfaces thereof, and the conjugate drivers 154, 156, which include tracking profiles (i.e., undulations) 166, 168, respectively, formed on tracking surfaces thereof, mesh together in conjugation throughout the range of motion of the piston device 110; and, thus, they cooperate to form a conjugate drive mechanism as that term is defined herein.

FIGS. 5–8 show the present invention at four different positions during the travel of the crankshaft 146 through ninety degrees of rotation. As the crankshaft 146 rotates, the crankpin 144 moves up and down within the yoke portion 140 relative to the axis of the cylinders 116, 118 (i.e., in a vertical direction). The horizontal component of crankpin 144 motion is translated into the rectilinear motion of the shuttle 134. The crankpin 144 is captured between the bearing surfaces 158, 160 of the conjugate drivers 154, 156 and is therefore prevented from contacting the interior periphery of the aperture 142. The conjugate drivers 154, 156 pivot about the crankpin 144 as the crankshaft 146 rotates, the bearing conjugates 148, 150 being immovable in the direction perpendicular to the linear path of the shuttle 134 and the pistons 126, 128. The conjugate drivers 154, 156 pivot in opposite directions and can therefore be said to be counter-rotating. The crankpin 144, assuming that it has an axial offset "r" from the crankshaft 146, causes a reciprocating linear motion of the shuttle of magnitude 2r, ranging from −r to +r.

Figure 9:
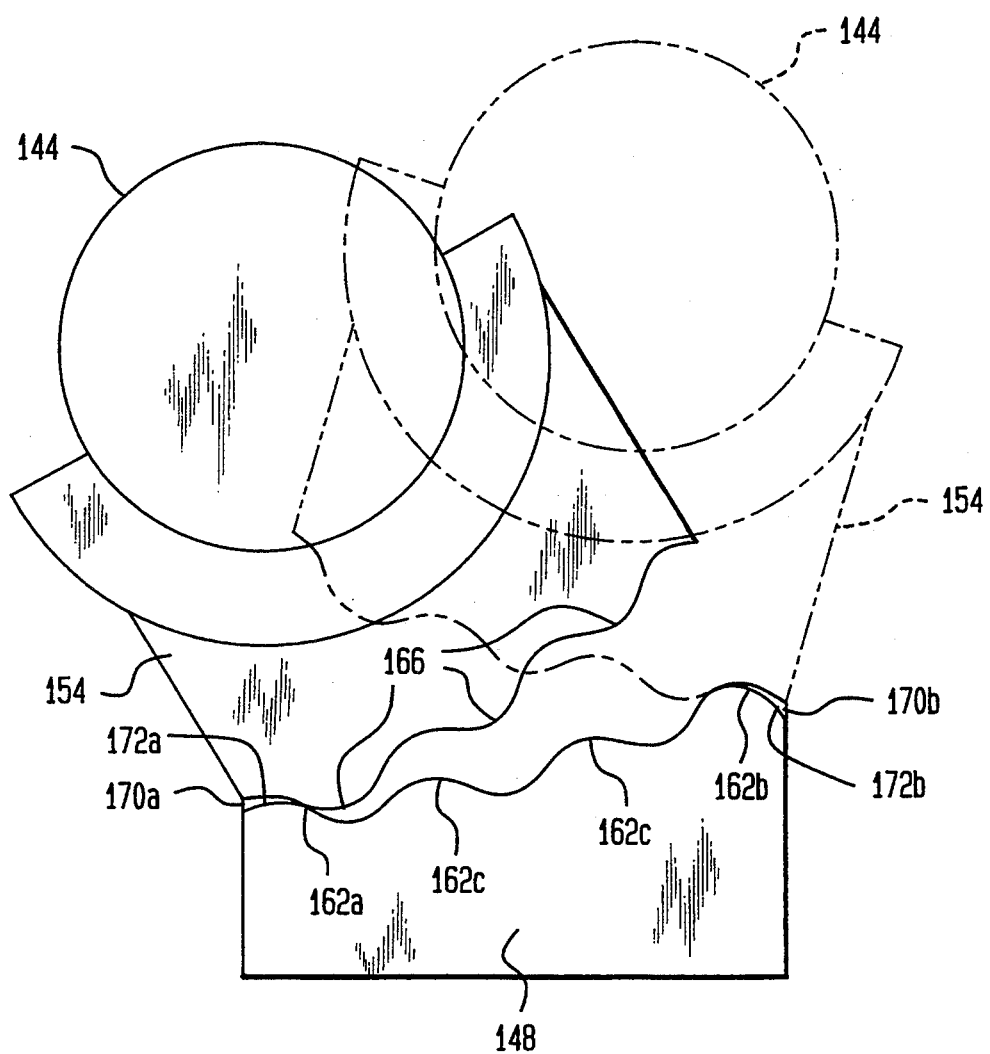
FIG. 9 is an enlarged front elevational view of a portion of the motion converter shown in FIG. 4.

Referring to FIG. 9, the conjugate driver 154 has a pre-defined range of pivotal movement relative to the bearing conjugate 148, the range being delimited by two end points: one of which is represented by the solid line representation of the conjugate driver 154 and the other of which is represented by the broken line representation of the conjugate driver 154. More particularly, the bearing conjugate 148 has exterior undulations 162a, 162b and interior undulations 162c, which mesh with the undulations 166 of the conjugate driver 154 and therefore function much like gear teeth. Stop pads 170a, 170b are provided on surfaces 172a, 172b, respectively, of the exterior undulations 162a, 162b, respectively. The stop pads 170a, 170b modify the profiles of the exterior undulations 162a, 162b so as to create increased surface engagement with their corresponding undulations 166 of the conjugate driver 154, thereby arresting the motion of the conjugate driver 154 and inhibiting it from moving beyond either of its end points and, as a result, reducing backlash and scuffing when the conjugate driver 154 reaches such end points. In other words, the stop pads 170a, 170b provide improved contact between the bearing conjugate 148 and the conjugate driver 154, thereby increasing the effectiveness of the conjugate drive mechanism.

The stop pads 170a, 170b can be made from a material which is the same as or different from that of the bearing conjugate 148 and/or the conjugate driver 154 and can be separate elements which are permanently and fixedly attached to the bearing conjugate 148 and/or to the conjugate driver 154. Alternatively, the stop pads 1704a, 1704b can be made integrally with the bearing conjugate 148 and/or with the conjugate driver 154. Further, the stop pads 1704a, 1704b can also be removably attached to the bearing conjugate 148 and/or to the conjugate driver 154 so that the stop pads 1704a, 1704b can be removed for repair, replacement, etc. The stop pads 170a, 170b can also be made adjustable by any conventional means to compensate for any wear of the stop pads 170a, 170b and/or the conjugate driver 154.

In a similar manner, the bearing conjugate 150 and/or the conjugate driver 156 could be provided with stop pads. In such a case, the motion of the conjugate drivers 154, 156 would be arrested simultaneously at each of the end points.

Figure 10:
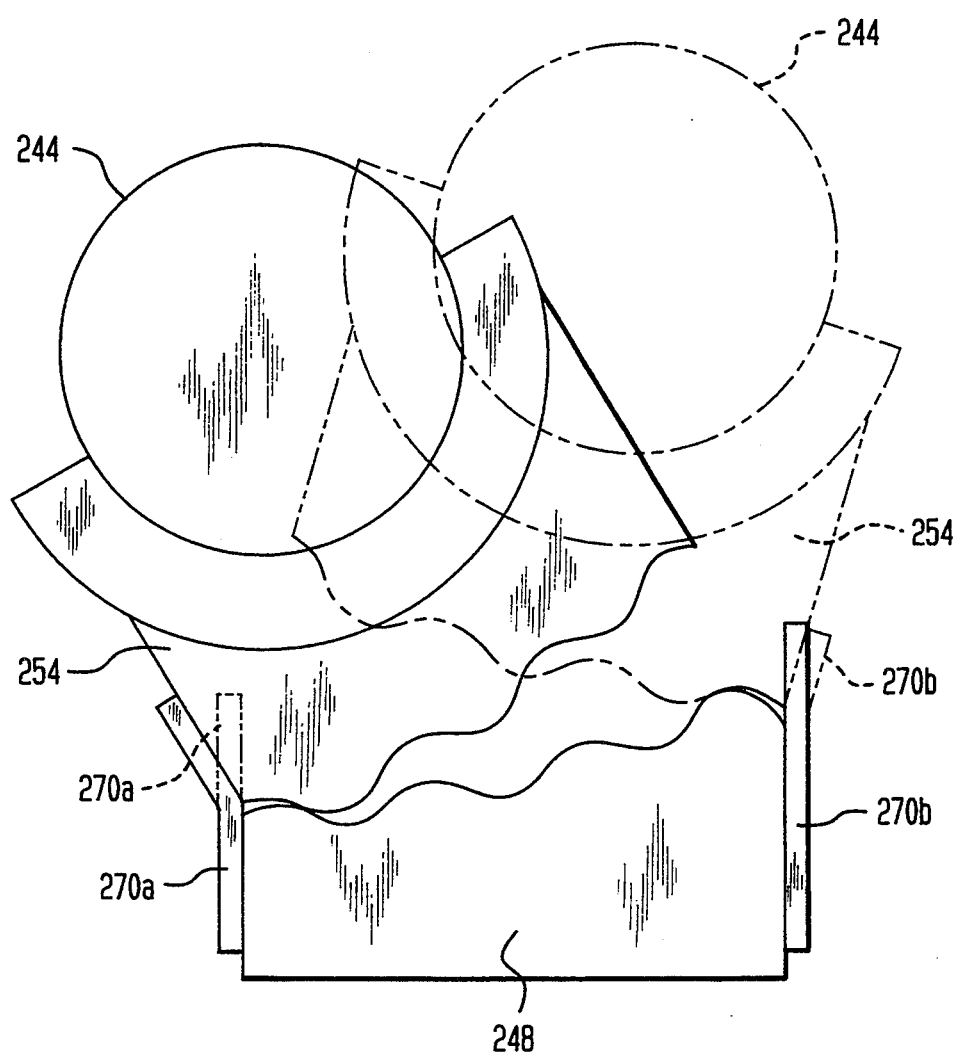
FIG. 10 is an enlarged elevational view of a modified version of the second exemplary embodiment shown in FIGS. 4–9.
Figure 11:
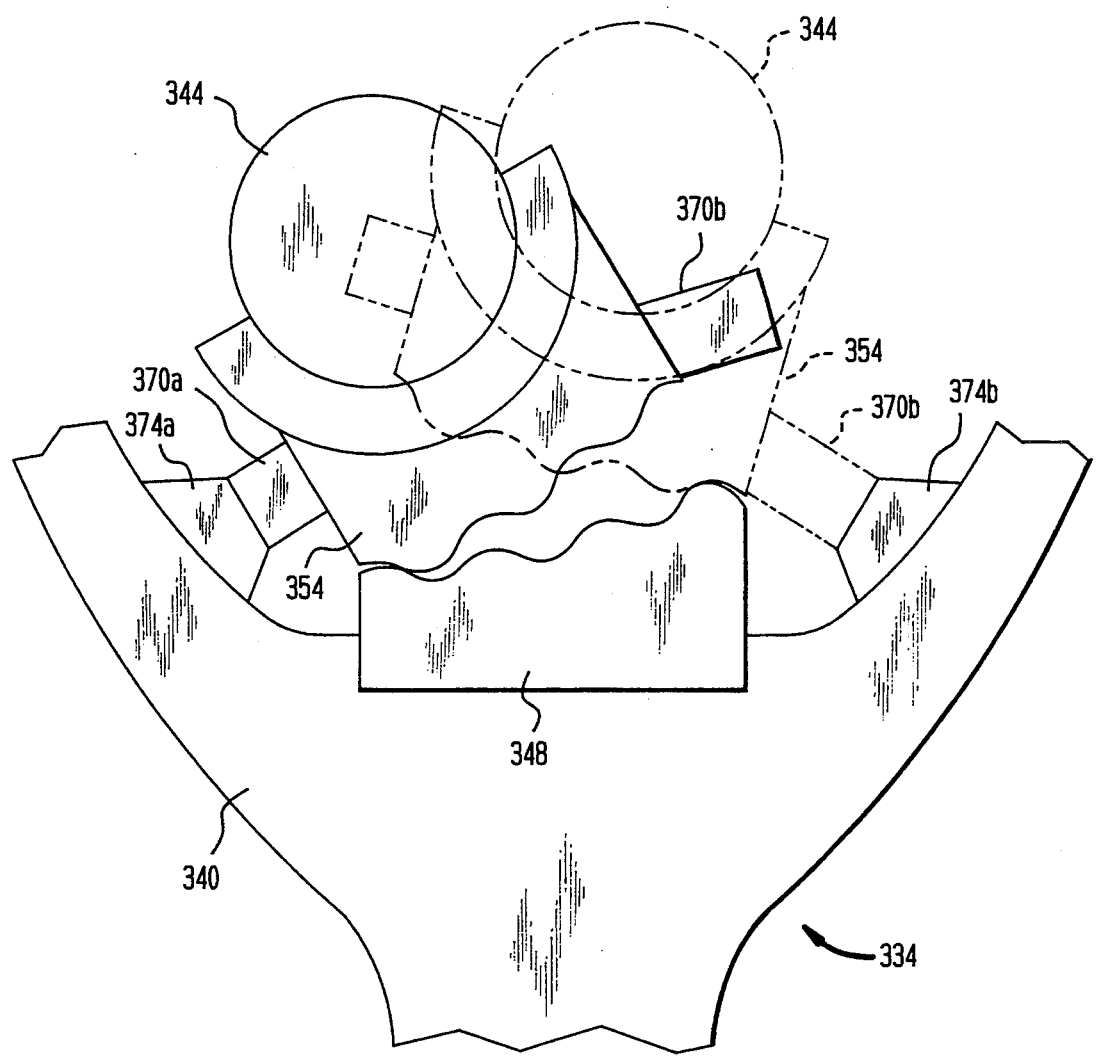
FIG. 11 is an enlarged elevational view of another modified version of the second exemplary embodiment shown in FIGS. 4–9.

FIGS. 10 and 11 depict modified versions of the motion arrester illustrated in FIGS. 4–9. In FIGS. 10 and 11, a numbering convention is employed wherein elements shown therein having a function or structure in common with a counterpart in previously discussed FIGS. 4–9 are given the same number incremented by one hundred and by two hundred, respectively.

Referring to FIG. 10, bearing conjugate 248 is provided with stop pads 270a, 270b, which are adjustably mounted on opposite sides thereof by, for instance, bolts (not shown) or any other type of conventional fastening mechanism. Each of the stop pads 270a, 270b is made from spring steel, rubber or any other suitable material having sufficient resiliency so that the stop pads 270a, 270b will deflect in response to their engagement by a corresponding side of conjugate driver 254, which is rotatably mounted on crankpin 244. More particularly, a free end of the stop pad 270a is movable between a rest position (illustrated by broken lines in FIG. 10), which it automatically assumes when not engaged by the conjugate driver 254, and a deflected position (illustrated by solid lines in FIG. 10), which it is urged into upon engagement by the conjugate driver 254. Similarly, a free end of the stop pad 270b is movable between a rest position (illustrated by solid lines in FIG. 10), which it automatically assumes when not engaged by the conjugate driver 254, and a deflected position (illustrated by broken lines in FIG. 10), which it is urged into upon engagement by a conjugate driver 254.

The stop pads 270a, 270b can be mounted on structural elements other than the bearing conjugate 248. For instance, the stop pads 270a, 270b could be mounted on an adjacent yoke portion of an associated shuttle (not shown).

Referring to FIG. 11, stop pads 370a, 370b are mounted on opposite sides of conjugate driver 354, rather than on opposite sides of bearing conjugate 348. The stop pads 370a, 370b are sized and shaped such that they are engageable with stop pads 374a, 374b, respectively, which are mounted on opposite sides of a yoke portion 340 of an associated shuttle 334. More particularly, when the conjugate driver 354 is at one of its end points of motion relative to the bearing conjugate 348, the stop pad 370a engages the stop pad 374a, while the stop pad 370b is out of engagement with the stop pad 374b (see the solid line representations of the stop pads 370a, 370b in FIG. 11). Conversely, when the conjugate driver 354 is at the other of its end points of motion relative to the bearing conjugate 348, the stop pad 370a is out of engagement with the stop pad 374a, while the stop pad 370b engages the stop pad 374b (see the broken line representations of the stop pads 370a, 370b in FIG. 11).

The stop pads 370a, 370b, as well as the stop pads 374a, 374b, can be made from steel, rubber or any other suitable material. Also, the stop pads 374a, 374b could be relocated from the yoke portion 340 of the shuttle 334 to some other adjacent structural element, such as another conjugate driver (not shown) mounted on crankpin 344. Alternatively, the stop pads 374a, 374b could be entirely eliminated.

It will be understood that the embodiments described herein are merely exemplary and that a person skilled in the art may make many variations and modifications without departing from the spirit and scope of the invention. For example, the present invention can be employed in conjunction with the motion converters disclosed in Brackett U.S. Pat. Nos. 4,590,812 and 4,779,472, provided that such motion converters are provided with a conjugate drive mechanism. All such modifications and variations are intended to be included within the scope of the invention as defined in the appended claims.

I claim:

1. A motion arrester for a conjugate drive mechanism of a scotch yoke type motion converter, comprising a linearly movable shuttle; a crankpin positioned within an aperture in said shuttle and rotatable in a circular path; a bearing conjugate forming a portion of a peripheral boundary of said aperture; a conjugate driver positioned within said aperture and rotatably mounted about said crankpin, at least a portion of said conjugate driver being located between said crankpin and said bearing conjugate, said conjugate driver and said bearing conjugate engaging each other continuously in conjugation between a first end point and a second end point as said crankpin rotates such that motion is transferable between said crankpin and said shuttle; and arresting means for arresting the motion of said conjugate driver relative to said bearing conjugate at said first end point and said second end point.

2. The motion arrester of claim 1, wherein said arresting means includes first arresting means for arresting the motion of said conjugate driver relative to said bearing conjugate at said first end point and second arresting means for arresting the motion of said conjugate driver relative to said bearing conjugate at said second end point.

3. The motion arrester of claim 2, wherein said bearing conjugate includes a first set of undulations and said conjugate driver includes a second set of undulations, said first set of undulations being in constant meshing engagement with said second set of undulations.

4. The motion arrester of claim 3, wherein said first arresting means includes a first stop pad provided on at least one undulation of one of said first and second sets of undulations and wherein said second arresting means includes a second stop pad provided on at least another undulation of one of said first and second sets of undulations.

5. The motion arrester of claim 4, wherein said first stop pad is provided on said conjugate driver.

6. The motion arrester of claim 5, wherein said second stop pad is provided on said conjugate driver.

7. The motion arrester of claim 5, wherein said second stop pad is provided on said bearing conjugate.

8. The motion arrester of claim 4, wherein said first and second stop pads are provided on said bearing conjugate.

9. The motion arrester of claim 1, wherein said arresting means is permanently attached to said conjugate driver.

10. The motion arrester of claim 1, wherein said arresting means is removably attached to said conjugate driver.

11. The motion arrester of claim 1, wherein said arresting means is adjustably attached to said conjugate driver.

12. The motion arrester of claim 1, wherein said arresting means is permanently attached to said bearing conjugate.

13. The motion arrester of claim 1, wherein said arresting means is removably attached to said bearing conjugate.

14. The motion arrester of claim 1, wherein said arresting means is adjustably attached to said bearing conjugate.

15. The motion arrester of claim 1, wherein the conjugate drive mechanism includes a pair of conjugate drivers rotatably mounted alongside each other on said crankpin and a pair of bearing conjugates formed on opposing portions of said peripheral boundary of said aperture, one of said pair of bearing conjugates being in constant meshing engagement with one of said pair of conjugate drivers as said one conjugate driver moves back and forth along said one bearing conjugate between a first end point and a second end point, and another of said pair of bearing conjugates opposing and being offset relative to said one bearing conjugate, said another bearing conjugate being in constant meshing engagement with another of said pair of conjugate drivers as said another conjugate driver moves back and forth along said another bearing conjugate between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

16. The motion arrester of claim 15, wherein said one bearing conjugate includes a first set of undulations and said one conjugate driver includes a second set of undulations, said first set of undulations being in constant meshing engagement with said second set of undulations; and wherein said another bearing conjugate includes a third set of undulations and said another conjugate driver includes a fourth set of undulations, said third set of undulations being in constant meshing engagement with said fourth set of undulations.

17. The motion arrester of claim 16, wherein said first arresting means includes a first stop pad provided on at least one undulation of one of said first and second sets of undulations and a second stop pad provided on at least another undulation of one of said first and second sets of undulations: and wherein said second arresting means includes a third stop pad provided on at least one undulation of one of said third and fourth sets of undulations and a fourth stop pad provided on at least another undulation of one of said third and fourth sets of undulations.

18. The motion arrester of claim 17, wherein said first and second stop pads are provided on said one bearing conjugate; and wherein said third and fourth stop pads are provided on said another bearing conjugate.

19. The motion arrester of claim 1, wherein the conjugate drive mechanism includes a pair of conjugate drivers and a pair of bearing conjugates formed on opposing portions of said peripheral boundary of said aperture, each of said pair of conjugate drivers being rotatable about said crankpin and independently articulatable through a selected range of degrees, one of said pair of conjugate drivers being in constant meshing engagement with one of said pair of bearing conjugates between a first end point and a second end point, and another of said pair of conjugate drivers being in constant meshing engagement with another of said pair of bearing conjugates between a third end point and a fourth end point, whereby motion is continuously transferable between said crankpin and said shuttle through said pair of conjugate drivers and said pair of bearing conjugates; and wherein said arresting means includes first arresting means for arresting the motion of said one conjugate driver relative to said one bearing conjugate at said first and second end points and second arresting means for arresting the motion of said another conjugate driver relative to said another bearing conjugate at said third and fourth end points.

20. The motion arrester of claim 19, wherein said one bearing conjugate includes a first set of undulations and said one conjugate driver includes a second set of undulations, said first set of undulations being in constant meshing engagement with said second set of undulations; and wherein said another bearing conjugate includes a third set of undulations and said another conjugate driver includes a fourth set of undulations, said third set of undulations being in constant meshing engagement with said fourth set of undulations.

21. The motion arrester of claim 20, wherein said first arresting means includes a first stop pad provided on at least one undulation of one of said first and second sets of undulations and a second stop pad provided on at least another undulation of one of said first and second sets of undulations; and wherein said second arresting means includes a third stop pad provided on at least one undulation of one of said third and fourth sets of undulations and a fourth stop pad provided on at least another undulation of one of said third and fourth sets of undulations.

22. The motion arrester of claim 21, wherein said first and second stop pads are provided on said one bearing conjugate; and wherein said third and fourth stop pads are provided on said another bearing conjugate.

23. The motion arrester of claim 20, wherein said first arresting means includes a first pair of stop pads mounted on opposite sides of said one bearing conjugate; and wherein said second arresting means includes a second pair of stop pads mounted on opposite sides of said another bearing conjugate.

24. The motion arrester of claim 20, wherein said first arresting means includes a first pair of stop pads mounted on opposite sides of said one conjugate driver; and wherein said second arresting means includes a second pair of stop pads mounted on opposite sides of said another conjugate driver.

25. The motion arrester of claim 24, wherein said first arresting means further includes a third pair of stop pads mounted on said shuttle such that each stop pad of said third pair of stop pads is engageable by a corresponding one of said stop pads of said first pair of stop pads; and wherein said second arresting means further includes a fourth pair of stop pads mounted on said shuttle such that each stop pad of said fourth pair of stop pads is engageable by a corresponding one of said stop pads of said second pair of stop pads.

* * * * *